United States Patent [19]

Barbehenn et al.

[11] Patent Number: 5,583,421
[45] Date of Patent: Dec. 10, 1996

[54] SEPIC CONVERTER WITH TRANSFORMERLESS LINE ISOLATION

[75] Inventors: George Barbehenn, Vancouver, Wash.; Steven B. Elgee, Portland, Oreg.

[73] Assignee: Hewlett-Packard Company, Palo Alto, Calif.

[21] Appl. No.: 289,024

[22] Filed: Aug. 10, 1994

[51] Int. Cl.$^6$ .................................................. G05F 1/656
[52] U.S. Cl. ........................................................ 323/222
[58] Field of Search ..................................... 323/220, 222, 323/223; 363/16, 20, 123, 124

[56] References Cited

U.S. PATENT DOCUMENTS

| | | | |
|---|---|---|---|
| 4,654,769 | 3/1987 | Middlebrook | 363/16 |
| 4,801,859 | 1/1989 | Disner | 323/222 |
| 4,811,185 | 3/1989 | Cook et al. | 363/24 |
| 5,270,636 | 12/1993 | Lafferty | 323/222 |
| 5,396,165 | 3/1995 | Hwang et al. | 323/210 |

FOREIGN PATENT DOCUMENTS 087593  9/1983  European Pat. Off. .

OTHER PUBLICATIONS

Integrating Research, Industry And Education In Energy And Communication Engineering, Libson, Apr. 11–13, 1989, No. 11, Apr. 1989 Barbosa AM, pp. 38–42, XP000078301, Vicuna De L G er al, "Discontinuous Condution Mode In the Sepic Converter", Figure 2.

NTIS Tech Notes, Oct. 1987, Springfield, VA, p. 953, "Transformerless dc–Isolated Converter".

IEEE IAS 12th Annual Meeting, 2–6 Oct. 1977, Los Angeles, CA, pp. 1110–1126, Cuk and Middlebrook, "Coupled--Inductor And Other Extensions Of A New Optimum Topology Switching DC–to–Converter", p. 1120, right column; figure 23.

L. H. Dixon: "High Power Factor Preregulator Using The SEPIC Converter," Unitrode Integrated Circuits, 1993.

*Primary Examiner*—Matthew V. Nguyen

[57] ABSTRACT

In DC-DC switching converters of the single-ended primary inductance (SEPIC) type, using a high frequency transformer to isolate the load from the AC power line is difficult because its leakage inductance causes serious circuit problems. In the invention, an additional coupling capacitor provides the required DC isolation without affecting circuit performance. The total coupling capacitance may be chosen to limit the power line frequency leakage current to a safe value.

7 Claims, 1 Drawing Sheet

5,583,421

SEPIC CONVERTER WITH TRANSFORMERLESS LINE ISOLATION

FIELD OF THE INVENTION

This invention pertains to DC—DC switching power supplies and, in particular, to obtaining powerline isolation between input and output in a SEPIC power supply.

BACKGROUND AND SUMMARY OF THE INVENTION

A very common need in electronics is converting AC powerline energy to DC power to supply an electronic circuit as a load. In addition, it is often necessary to regulate the DC power: that is, to maintain the load voltage approximately constant in spite of variations in the powerline voltage and the load current. Series regulators—in effect, controllable resistances in series with the load—have given place, in many applications, to switching regulators. In these regulators, the powerline voltage is rectified to DC, which is then switched into various inductors and capacitors at a frequency hundreds or thousands of times higher than the powerline frequency. These reactances alternately absorb powerline energy and deliver it to the load in a manner which is controlled to provide a constant load voltage.

A major reason for the popularity of switching regulators is that their power conversion efficiency can approach 100%, a figure unobtainable with series regulators.

Standard switching regulator topologies include the buck regulator, in which the output DC voltage is less than the input, and the boost regulator, whose output voltage is higher than the input. The single-ended primary inductance converter (SEPIC) is a more recent topology which uses two inductors and which has the considerable advantage of allowing the output voltage to be either higher or lower than the input.

A good discussion of the theory of operation of the SEPIC converter and its advantages and limitations is found in the paper "High power factor preregulator using the SEPIC converter", by Lloyd H. Dixon, Jr., which is included herein by reference. The paper is found in the Unitrode Power Supply Design Seminar Manual, copyright 1993 and published by Unitrode Integrated Circuits, Merrimack, N.H.

One problem which must be solved for most regulators is how to isolate the human operator (of the electronic circuit) from any possibility of direct contact with the AC powerline. A common solution is to use a transformer in the line-to-load path, either at the line frequency, or, preferably, at the higher switching frequency. But the transformer, while providing ohmic (DC) isolation, must also have a limited primary-secondary capacitance, so that line frequency leakage current which could flow through this capacitance will be restricted to a safe value.

As Dixon explained on page 6–11, there are technical reasons why it is difficult to include a transformer at the switching frequency in a SEPIC converter. He further added that there were no known solutions to the difficulties and that a solution, if found, would enhance the usefulness of the SEPIC topology.

In the present invention, powerline isolation in a SEPIC converter is achieved without using a transformer. Referring to FIG. 1, the converter is shown, for explanatory clarity, as comprising a primary circuit 20 coupled to a secondary circuit 30. The forward paths (22,32) of these circuits are connected with a capacitor Cc1, while their return paths (24,34) are connected with a low ohmic conductor, such as a wire. Clearly, the return path connection could subject one who touches the load 40 to a dangerous contact with the powerline supplying the source energy Vi and Ii. (There can also be a path of mutual inductance between L1 and L2, but this path would provide isolation at line frequencies.) In the invention, explained in more detail below, a second coupling capacitor Cc2 substitutes for the conductor in the return path (24,34), thus providing ohmic isolation for the output. If the series equivalent capacitance of Cc1 and Cc2 are chosen to equal the previous value of Cc1, there is no change in the high frequency operation of the circuit. Likewise, the parallel combination of the two coupling capacitors may be chosen to limit the leakage current to a safe value.

DETAILED DESCRIPTION

Figure 1:
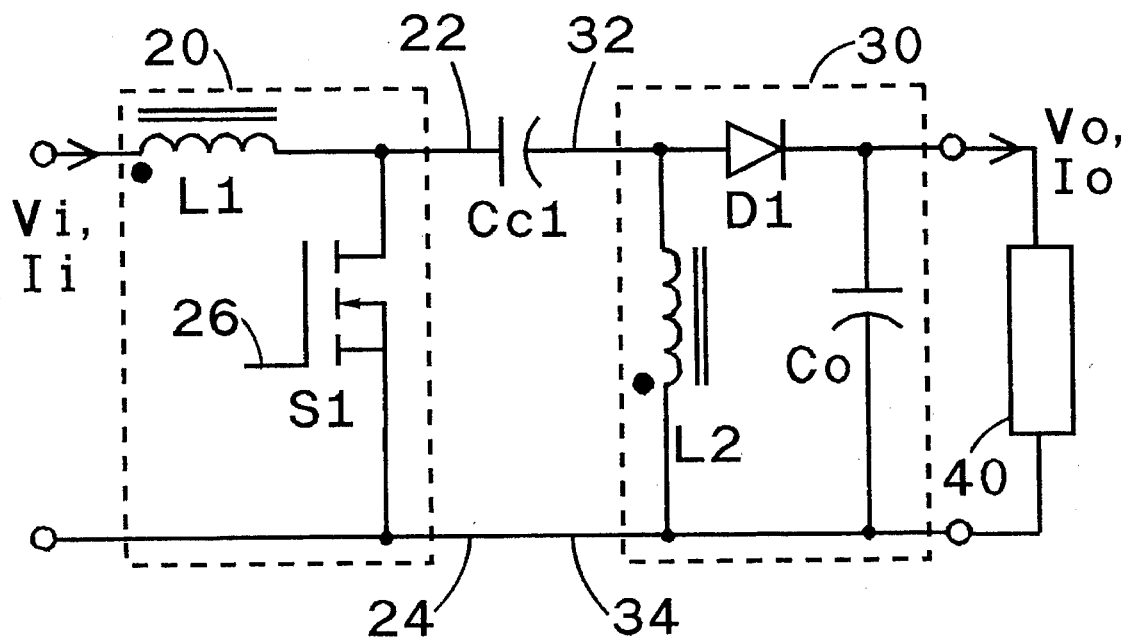
FIG. 1 is a simplified circuit diagram of a prior art SEPIC converter.

Referring now to FIG. 1, a simplified circuit diagram of a prior art SEPIC converter, the principle elements and features of the circuit will shortly be described. For a full understanding of the scope of the present invention, it is not necessary to study the detailed operation of the circuit. This operation is described adequately in the referenced Dixon paper.

A source of rectified line power, with voltage Vi and current Ii, supplies the converter at the input of primary circuit 20. Primary circuit 20 consists of inductor L1 and switch S1. Switch S1 is, typically, a MOSFET whose ON/OFF states are controlled by an appropriate voltage applied to gate 26. A secondary circuit 30 consists of inductor L2, rectifying diode D1, and filter capacitor Co. A load—presumably an electronic circuit—is shown symbolically as a box 40. Secondary circuit 30 is connected to load 40 and delivers regulated power to it as voltage Vo and current Io, as shown on the right side of the figure. The forward paths 22 and 32 of the primary and secondary circuits 20 and 30 are coupled together by capacitor Cc1, an important element in a SEPIC converter (reference, page 6-2ff). The return paths 24 and 34 are linked by a conductor.

It is evident that this circuit does not isolate the load (and a human user who may touch it) from the rectified line. If a "hot" (i.e., dangerous) line is connected to the primary return 24, its connection to the load is obvious. Even if the hot line is connected to the input of L1, there is still a low impedance connection to the load via L1, whose reactance is small at the line frequency, and switch S1, which is closed a sizable fraction of the time.

When line isolation is needed, a common practice is to insert a transformer which provides high primary-secondary resistance, often hundreds of megohms. It is economical, in switching supplies, to locate such a transformer in the high frequency portion of the circuit, since its core and windings can be much smaller than an equivalent transformer operating at the powerline frequency. In the SEPIC converter, it would be natural to convert L2 into a two-winding transformer, with primary inductance the same value as L2. However, in the reference (page 6–11), it is explained that the leakage inductance of such a transformer causes intractable problems in this converter. Hence, providing line isolation is regarded, in the reference, as an unsolved problem.

Figure 2:
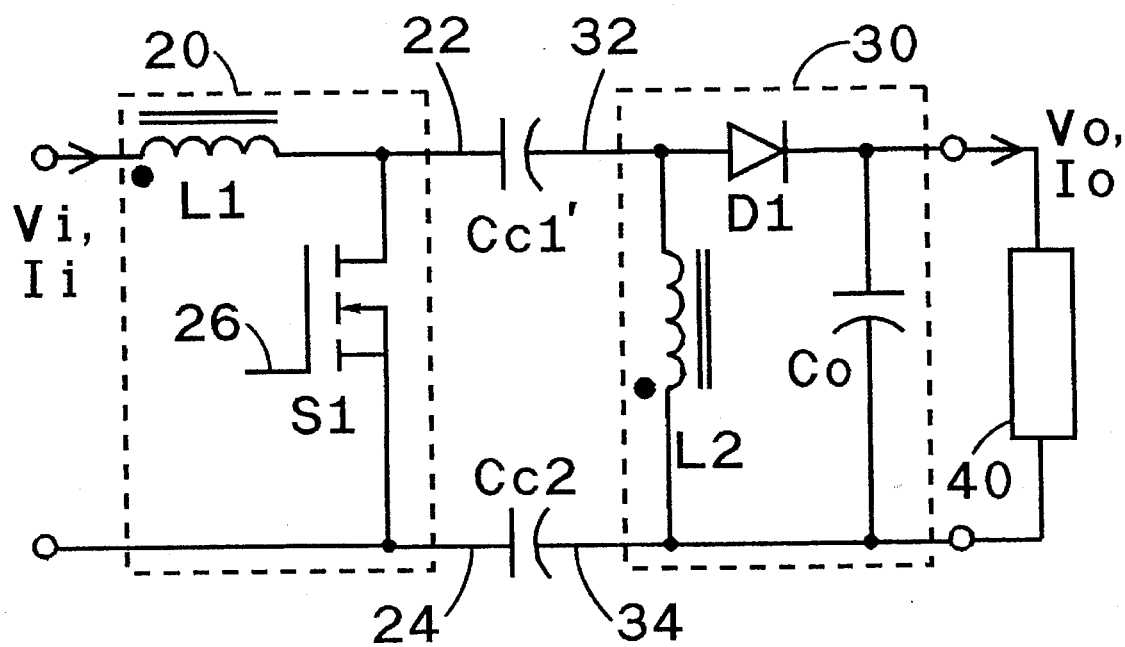
FIG. 2 is a simplified circuit diagram of an improved SEPIC converter according to one embodiment of the invention.

In a preferred embodiment of the invention, illustrated in FIG. 2, line isolation is achieved by coupling the return paths 24 and 34 with a second capacitor Cc2. If the series capacitance of Cc1' and Cc2 is the same value as Cc1, there is no effect on the circuit operation. This may be seen by noting that any circuit mesh, such as L1-Cc1'-L2 or S1-Cc1'-D1-Co, which passes through Cc1 also passes through Cc2.

Regarding line frequency leakage current which can flow through the capacitive reactance: Cc1' and Cc2 are effectively in parallel, at least when S1 is closed. Hence their parallel capacitance must be limited to that value which causes no more leakage current than what is allowed under recognized safety criteria, such as published by Underwriters Labs. This upper bound on the total capacitance may also constrain the maximum power level at which the circuit may operate. This is because the pulsed current flowing through the coupling capacitors causes a triangular voltage waveform to appear on each. The amplitude of the waveform is proportional to the current and inversely proportional to the capacitance. Hence, with a maximum allowed value of capacitance, circuit constraints may limit the current magnitude also.

We have described and illustrated the principles of our invention with reference to a preferred embodiment; however, it will be apparent that the invention can be modified in arrangement and detail without departing from such principles. It will be recognized that the detailed embodiment is illustrative only, and should not be taken as limiting the scope of our invention. Rather, we claim as our invention all such variations as may fall within the scope and spirit of the following claims and equivalents thereto.

We claim:

1. A DC-DC single-ended primary inductance converter (SEPIC) coupled between a source of DC energy and a load, comprising:

a primary circuit having an input coupled to the source of DC energy and an output comprising forward and return paths;

a secondary circuit having an input comprising forward and return paths and an output coupled to the load;

a first coupling capacitor connected between the forward path output of the primary circuit and the forward path input of the secondary circuit; and a second coupling capacitor connected between the return path output of the primary circuit and the return path input of the secondary circuit.

2. A SEPIC converter, as recited in claim 1, wherein the total capacitance of the first and second coupling capacitors is a capacitance value limiting powerline frequency leakage current between primary and secondary circuits to less than a predetermined amount.

3. A SEPIC converter, as recited in claim 1, wherein the primary circuit includes a primary inductor, the secondary circuit includes a secondary inductor, and the primary inductor and secondary inductor are mutually coupled.

4. In a DC-DC SEPIC converter of the type including a primary circuit having an output with forward and return paths, a secondary circuit having an input with forward and return paths, a method for obtaining DC isolation between primary and secondary circuits without using a transformer, comprising the steps of:

coupling the forward output path and the forward input path with a first coupling capacitor; and coupling the return output path and the-return input path with a second coupling capacitor.

5. In a method for obtaining DC isolation between primary and secondary circuits of a SEPIC converter, as recited in claim 4, the additional step of limiting the total capacitance of the first and second coupling capacitors to a value which prevents primary to secondary circuit powerline frequency leakage current from exceeding a predetermined value.

6. In a DC-DC single-ended primary inductance converter (SEPIC) of the type including a primary circuit comprising a primary inductor and a switch, and having an output with forward and return paths; a secondary circuit comprising a secondary inductor, a rectifying diode, and a filter capacitor and having an input with forward and return paths; and a first coupling capacitor connected between the primary and secondary forward paths, the improvement which comprises:

a second coupling capacitor connected between the primary and secondary return paths.

7. An improved SEPIC converter, as recited in claim 6, wherein the primary and secondary inductors are mutually coupled.

* * * * *